US011614054B2

(12) United States Patent
Takahashi et al.

(10) Patent No.: US 11,614,054 B2
(45) Date of Patent: Mar. 28, 2023

(54) ROTARY TYPE CARBURETOR FOR STRATEFIED SCAVENGING ENGINE

(71) Applicant: ZAMA JAPAN CO. LTD., Iwate (JP)

(72) Inventors: Takumi Takahashi, Iwate (JP); Mineyuki Tamura, Iwate (JP); Hideki Sasaki, Iwate (JP); Hiroki Sato, Iwate (JP)

(73) Assignee: ZAMA JAPAN KABUSHIKI KAISHA, Iwate (JP)

( * ) Notice: Subject to any disclaimer, the term of this patent is extended or adjusted under 35 U.S.C. 154(b) by 43 days.

(21) Appl. No.: 17/134,910

(22) Filed: Dec. 28, 2020

(65) Prior Publication Data

US 2021/0207559 A1     Jul. 8, 2021

(51) Int. Cl.
*F02M 9/08*         (2006.01)
(52) U.S. Cl.
CPC .............. *F02M 9/08* (2013.01); *F02M 9/085* (2013.01)
(58) Field of Classification Search
CPC .................................. F02M 9/08; F02M 9/085
See application file for complete search history.

(56) References Cited

U.S. PATENT DOCUMENTS 7,722,015 B2 *   5/2010   Koizumi ................ F02M 17/04
261/23.3

FOREIGN PATENT DOCUMENTS

| JP | 10-252565   | 9/1998 |
| JP | 2002-256975 | 9/2002 |
| JP | 2008-163754 | 7/2008 |

* cited by examiner

*Primary Examiner* — Robert A Hopkins
(74) *Attorney, Agent, or Firm* — One LLP (57) ABSTRACT

An improved rotary type carburetor for a stratified scavenging engine designed to enable the easy adjustment of air and fuel flow at the time of initial configuration is disclosed. The improved rotary carburetor includes an air intake passage and an air-fuel mixture passage formed in a horizontal direction on a carburetor main body. The throttle valve of the improved rotary carburetor can be fitted into a cylindrical-throttle-valve hole formed orthogonal to a fuel and an air passage of the carburetor main body. The throttle valve has the air supply side valve hole formed on the air intake passage side and a fuel supply side valve hole formed on the air-fuel mixture passage side.

2 Claims, 13 Drawing Sheets

FIG. 1

PRIOR ART

ROTARY TYPE CARBURETOR FOR STRATEFIED SCAVENGING ENGINE

CROSS-REFERENCED TO RELATED APPLICATION

The subject application claims the benefit of Japanese Patent Application No. 2020-001166, filed Jan. 8, 2020, which application is incorporated herein by reference in its entirety.

TECHNICAL FIELD

The disclosure relates generally to a rotary type carburetor for a stratified scavenging engine suitable for a two-stroke internal combustion engine such as a power saw or a lawn mower.

BACKGROUND

The use of conventional rotary throttle valve carburetors found in two-stroke internal combustion engines has greatly increased as they are essential in portable machinery for agriculture, forestry, and small vehicle. The rotary throttle valve is formed from a rotor that rotates in the axial direction of the valve.

One type of rotary type carburetor, as disclosed in JP H10-252565A, employs a cylindrical throttle valve, which has a throttle-valve hole and a metering pin orthogonal to an air intake passage of the carburetor main body. The throttle valve is capable of rotating and moving in the axial direction at the time of rotation. By rotating the throttle valve, the amount of air flow is controlled while changing the degree of overlapping with the air intake passage of the throttle valve hole. In addition, the fuel flow is controlled by changing the insertion depth of the metering pin into the fuel nozzle.

Figure 1:
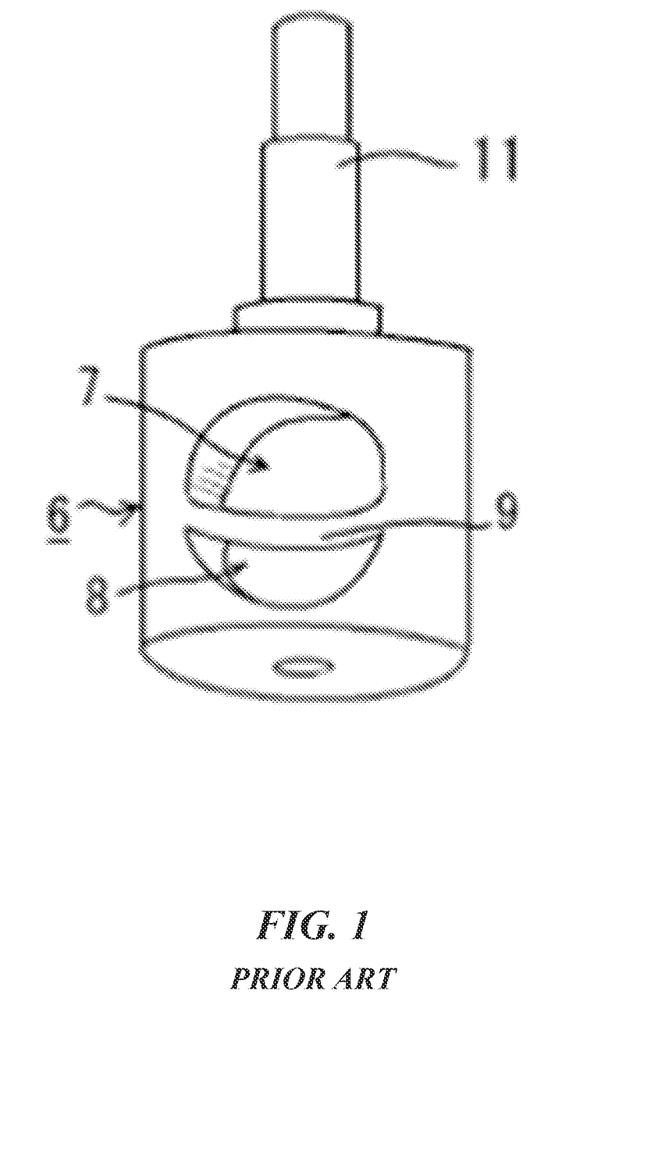
FIG. 1 is a perspective diagram of a conventional throttle valve.

The throttle valve has two circular shape valve holes in a mutual axis rotor. In order to open a fuel supply side valve hole first when idling, the rotor outer diameter of the air supply side valve hole is enlarged. The rotor is configured in two stages. For example, FIG. 1 shows a throttle valve 6 that includes a semicircular air supply side valve hole 7 that is oriented upward (toward rotation shaft 11) from a partition wall 9. Throttle valve 6 also includes a lower semicircular fuel supply side valve hole 8.

Figure 2:
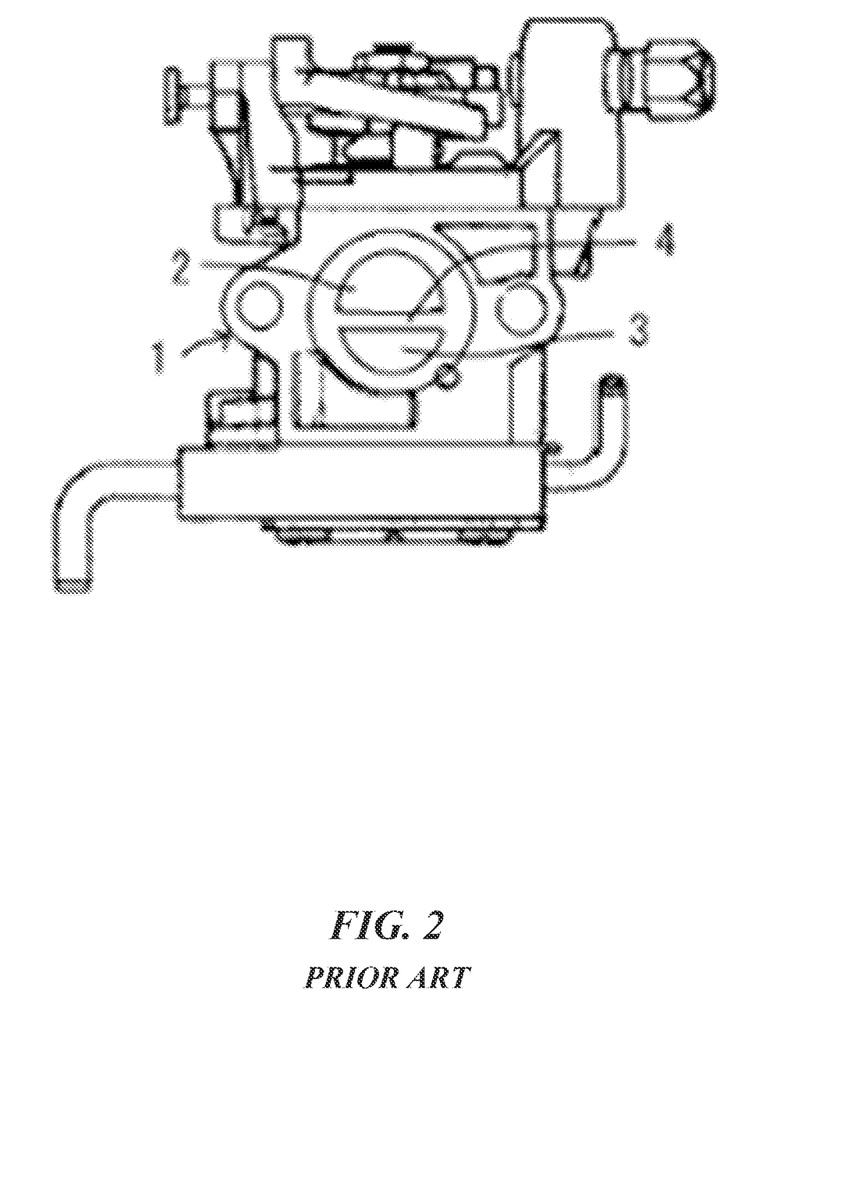
FIG. 2 is a front view of a conventional carburetor main body.

FIG. 2 shows a carburetor main body 1 having an air intake passage 2, a fuel-air mixture passage 3, and wall 4. The throttle valve opposing the semicircular air supply side valve hole 7 and the lower semicircular fuel supply side valve hole 8. This has the benefits of having a simple construction, the carburetor can be miniaturized because the height of the carburetor can be minimized, and it is also possible to design a small engine.

However, as illustrated in FIG. 1 and FIG. 2, a conventional throttle valve, with a partition wall 9 and valve holes, has difficulty maintaining an idle air-fuel ratio with a small amount of air. This issue occurs because throttle valve 6 is displaced downwards during idle opening and the air supply side valve hole 7 opens first. Additionally, the fuel supply side valve hole 8 is constructed to open afterwards.

Figure 3:
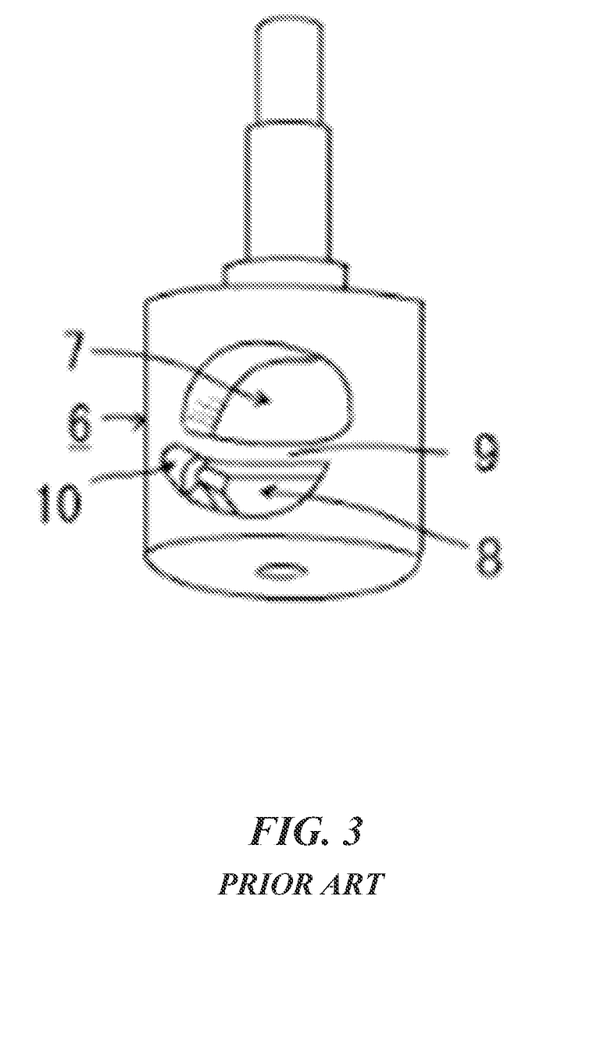
FIG. 3 is a perspective diagram of another conventional throttle.

FIG. 3 shows a conventional throttle valve 6 having a groove pocket 10. By forming the groove pocket 10 on the opening edge of the upstream end, which faces the accelerating rotation direction side of the fuel supply side valve hole 8, driving becomes possible between the initial stages of idling to intermediate idle opening in the groove pocket 10 of the fuel supply side valve hole 8. Because all of the air and fuel is supplied to the engine side via the groove pocket 10, the emulsion becomes relatively high speed, which for a rotary type carburetor improves rotation drop-in during the idle full body position change by supplying the emulsion to the engine as disclosed in JP 2008-163754A.

Generally, it is necessary to correct dispersion when assembling and it is necessary to initialize to conform with exhaust gas regulations. A bench test and an initialization must be performed so that the air flow and fuel flow are suitable at least in an idle region. In addition to controlling the air flow while changing the overlap between the throttle valve hole of the throttle valve and the air intake passage formed on the carburetor main body, the fuel flow is controlled by changing the insertion depth of the metering pin into the fuel nozzle. The initial configuration moves the throttle valve in the axial direction using an idle adjusting screw in the idling region where the groove pocket overlaps the air-fuel mixture passage (not shown). The air flow and the fuel flow are adjusted to a predetermined target specification (see FIG. 4) by adjusting the insertion depth into the fuel nozzle, which is adjusted by moving the metering pin in the axial direction using a fuel adjusting screw (not shown).

Figure 5:
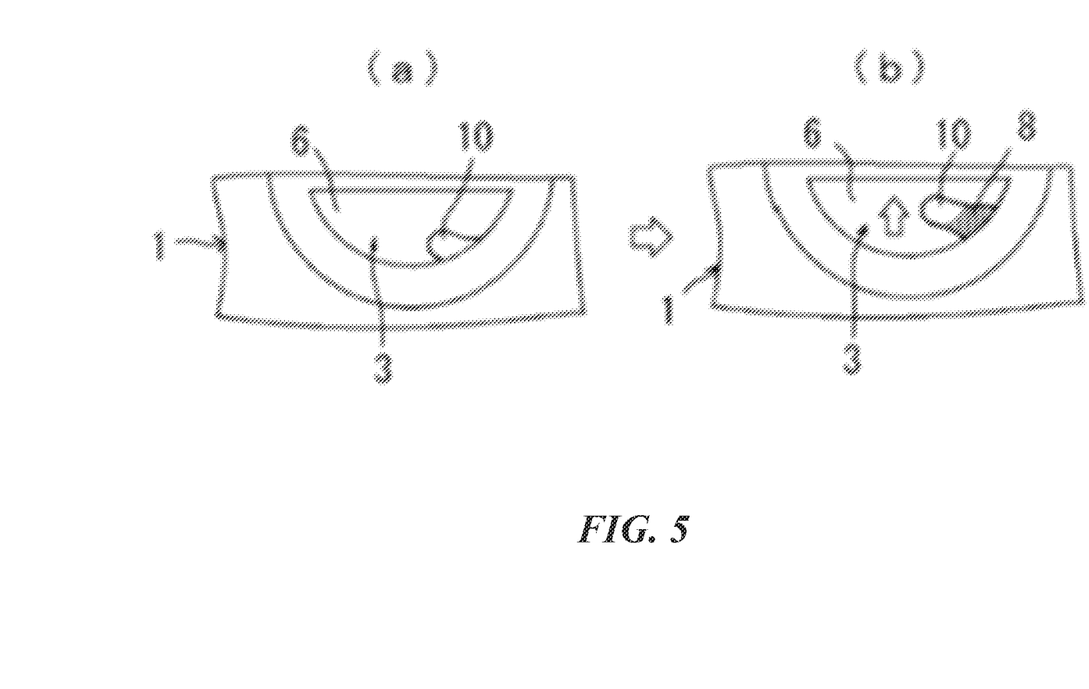
FIGS. 5A and 5B illustrate a conventional throttle valve exposed to an air-fuel mixture passage of a carburetor main body in a conventional idle region in different states.

Increases or decreases in the fuel flow can be achieved by moving the throttle valve in the axial direction. When the fuel is increased using an adjusting screw (not shown) in the idling region illustrated in FIG. 5A, the throttle valve 6 moves in the axial direction (shown in the upward direction) such that groove pocket 10 of the fuel supply side valve hole 8 moves in between the air-fuel mixture passage 3 of the carburetor main body 1 as illustrated in FIG. 5B.

In this conventional example, the degree of opening of the groove pocket 10 of the fuel supply side valve hole 8 in the throttle valve 6 necessarily increases (the diagonal line portion illustrated) because the air-fuel mixture passage 3 is a downwardly oriented semicircular shape, and the air flow (air) is simultaneously changed simply by changing the fuel flow (fuel).

Figure 4:
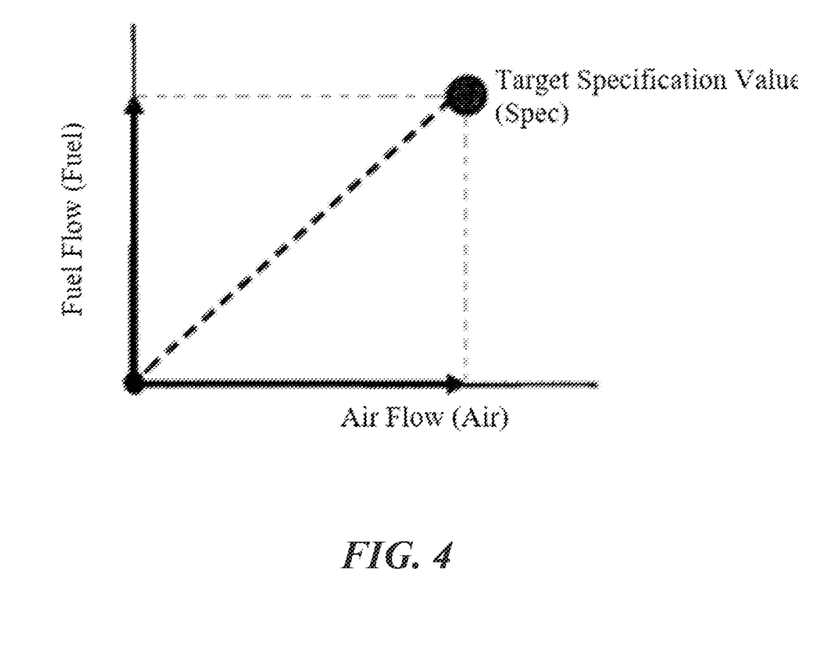
FIG. 4 is a state diagram illustrating a state of adjusting to the target specification by adjusting the fuel flow and air flow in the idle region at the time of delivery.
Figure 6:
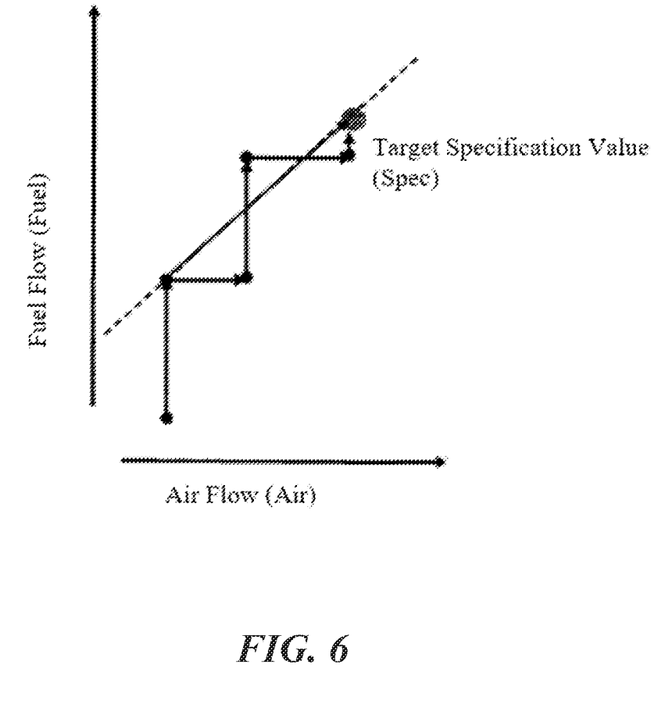
FIG. 6 is a state diagram illustrating a state of adjusting to the target specification by adjusting the fuel flow and air flow in the idle region at a time of delivery.
Figure 7:
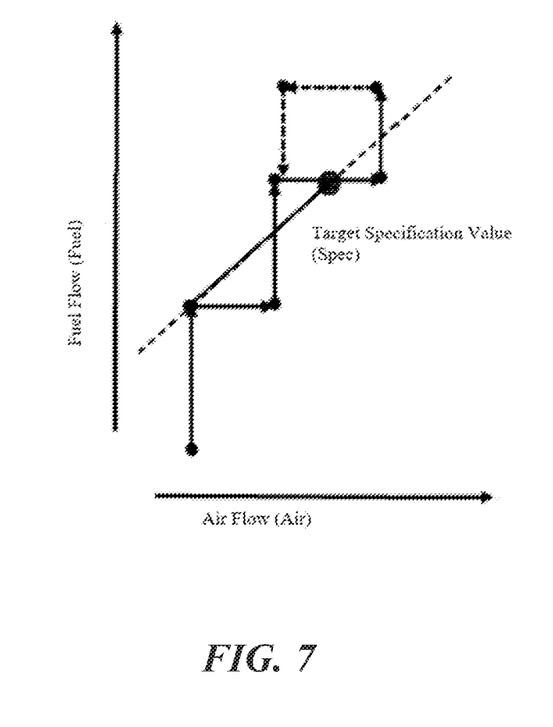
FIG. 7 is a state diagram illustrating a state of adjusting to the target specification by adjusting the fuel flow and air flow in the idle region at a time of delivery.

Thus, even if the fuel flow is adjusted to a state where the prescribed air flow is determined to first reach the target specification, the air flow will change. This makes the adjustment of the initial configuration to a predetermined target specification as illustrated in FIG. 4 extremely difficult. In this scenario, productivity is extremely unfavorable because adjustments need to be made by carrying out many fine adjustments of the air and fuel flow in the vicinity of the target specification as illustrated in FIG. 6 or FIG. 7.

Furthermore, Japanese Application No. JP 2002-256975A discloses a rotary carburetor that simplifies idling adjustments by having adjusting screws that can each individually adjust the air flow and fuel flow. However, as described above, the difficulty in adjusting the initial configuration originates in the shape of the groove pocket 10 of the fuel supply side valve hole 8 and in the downwardly oriented semicircular shape of the air-fuel mixture passage 3 formed on the carburetor main body 1. Because the air flow changes simultaneously when adjusting the fuel flow, by moving the throttle valve in the axial direction, it fails to resolve the complications in the adjustment of the initial configuration.

SUMMARY OF INVENTION

One of the objectives of the present disclosure is to obtain improvement in engine efficiency and productivity by making it easy to adjust the air flow and the fuel flow at the time of initial configuration of the idle driving region to achieve a predetermined target specification.

Disclosed herein is an improved rotary type carburetor (improved rotary carburetor) for a stratified scavenging engine designed to enable the easy adjustment of air and fuel flow at the time of initial configuration. The improved rotary carburetor includes an air intake passage and an air-fuel mixture passage formed in a horizontal direction on a carburetor main body. The throttle valve of the improved rotary carburetor can be fitted into a bottomed-cylindrical-throttle-valve hole formed orthogonal and perpendicular to each passage of the carburetor main body. The throttle valve has an air supply side valve hole formed on the air intake passage side and a fuel supply side valve hole formed on the air-fuel mixture passage side.

The improved rotary carburetor includes a groove pocket formed on an opening edge on an upstream end, which is on an accelerating rotation direction side of the fuel supply side valve hole (of the throttle valve). The improved rotary carburetor also includes an opening shape on the downstream side of an opening end on at least the throttle valve side of the air-fuel mixture passage, which is formed on a perpendicular side parallel to an axis of the throttle valve.

In some embodiments, the cross-sectional shape of the air-intake passage formed on the carburetor main body can be an upper semicircle. The cross-sectional shape of the air-fuel mixture passage can be a lower semicircle. The upper and lower semicircles are separated by a partition wall. The cross-sectional shape of the air-supply-side valve hole can be the upper semicircle, and a cross-sectional shape of the fuel-supply-side valve hole side can be the lower semicircle. Similarly, the air-supply-side and the fuel-supply-side valves can form a circle separated by a partitioned wall. In this way, the carburetor main body can be miniaturized.

Additionally, the improved rotary carburetor includes a groove pocket formed on the opening edge on the upstream end, which is on the accelerating rotation direction side of the fuel supply side valve. The fuel supply side valve can have a tongue-shaped opening end having parallel opposing sides. In this way, the improved rotary carburetor can make adjustments easily and accurately.

Furthermore, the shape (e.g., length, height, width) of the opening shape of the opening end of the throttle valve side is selected such that a portion formed by the parallel opposing sides of the groove pocket does not extend further into the air-fuel mixture passage during an adjustment of the throttle valve. In some embodiments, the opening shape of the opening end of throttle valve side of the air-fuel mixture passage formed on the carburetor main body is rectangularly shaped.

The improved rotary carburetor can improve efficiency and productivity by adjusting the air flow and fuel flow to a predetermined target specification (spec) by adjusting the insertion depth into the fuel nozzle by establishing the air flow because the opening area into the air-fuel mixture passage of the groove pocket does not change or only changes slightly even when the fuel is increased or decreased by moving the throttle valve in an axial direction using an adjusting screw in the idle region wherein the groove pocket overlaps the air-fuel mixture passage.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Improved Rotary Carburetor

Figure 8:
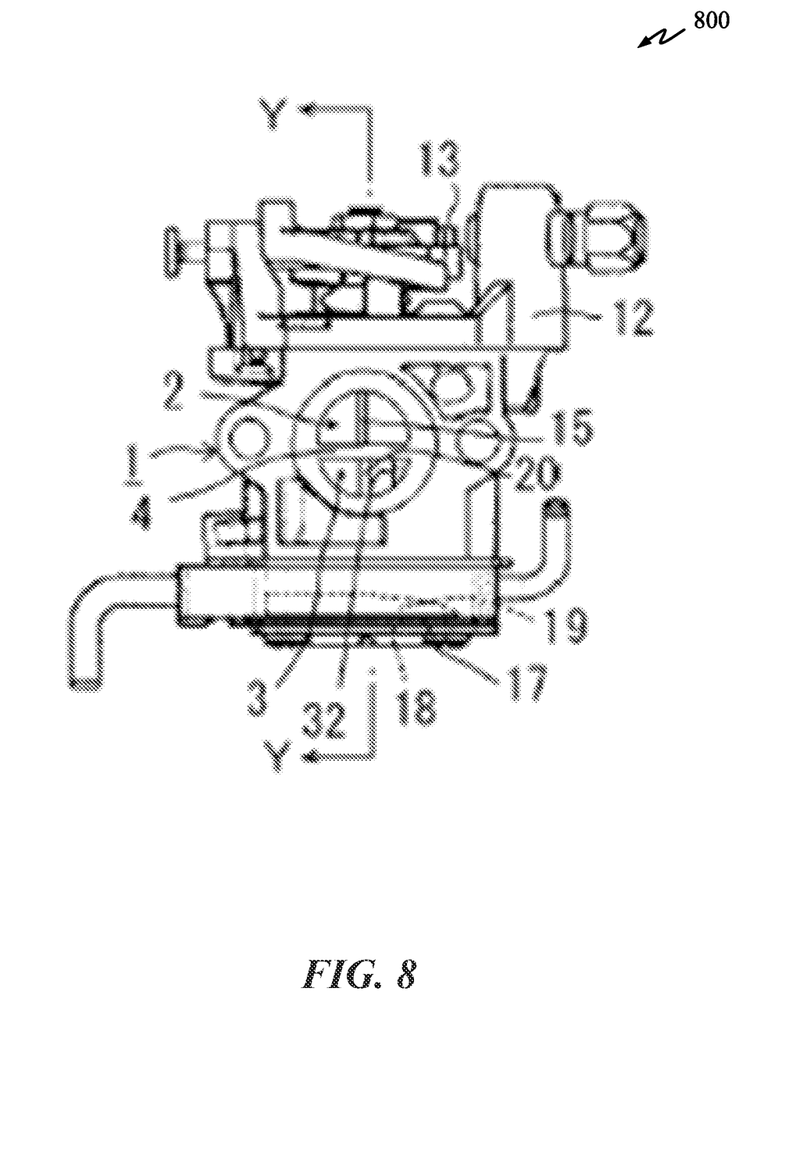
FIG. 8 is a front view of a carburetor main body in accordance with some embodiments of the present disclosure.

FIG. 8 illustrates a front view of a rotary type carburetor 800 for a stratified scavenging in accordance with some embodiments of the present disclosure. Carburetor 800 includes a carburetor main body 1, an air intake passage 2 formed through carburetor main body 1, an air-fuel mixture passage 3 formed through the carburetor main body 1, and a partition wall 4 formed on the carburetor main body 1 to separate air intake passage 2 and air-fuel mixture passage 3.

Figure 9:
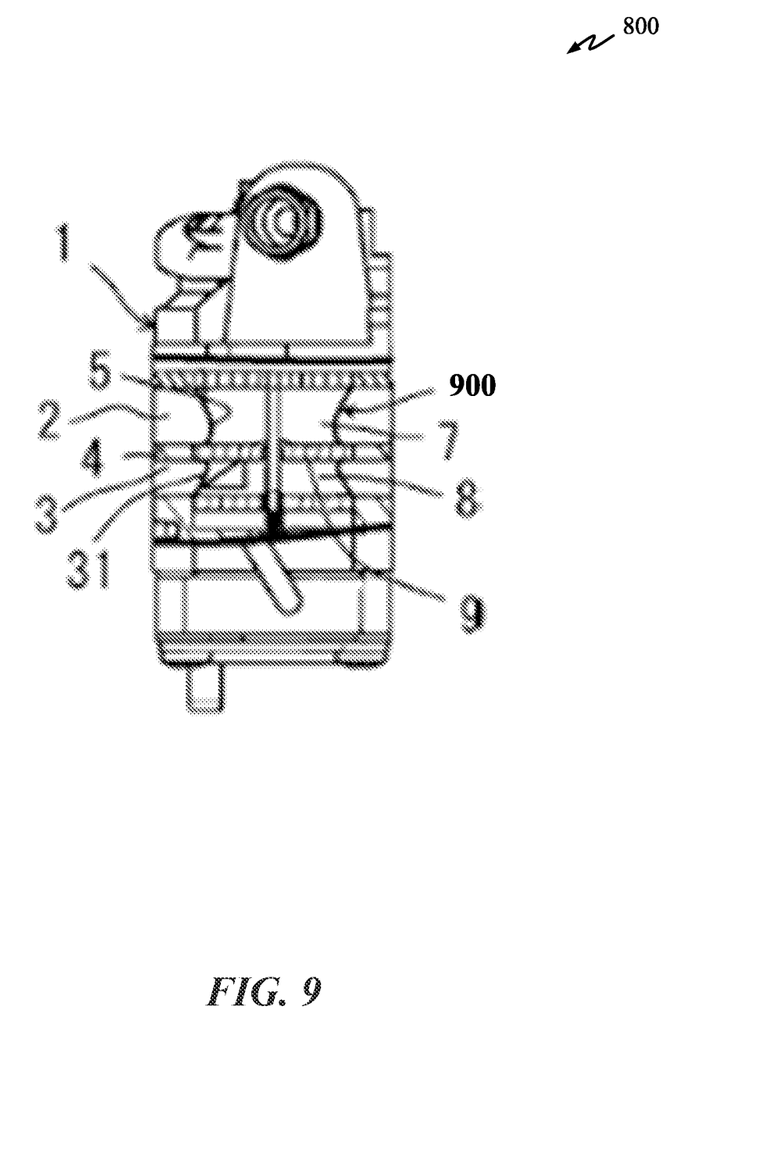
FIG. 9 is a side view with a portion broken down along the Y-Y line of FIG. 1 in accordance with some embodiments of the present disclosure.

FIG. 9 illustrates a cross-section of a portion of rotary carburetor 800. FIGS. 8 and 9 will be discussed concurrently. Rotary carburetor 800 includes an air intake passage 2 and an air-fuel mixture passage 3, both passages 2,3 can have a semicircular cross-sectional shape. Passages 2 and 3 are separated by partition wall 4. In the configuration shown in FIG. 8, air intake passage 2 can be located in the upper region (on top of partition wall 4) and air-fuel mixture passage 3 can be located in the lower region (below the partition wall 4). In some embodiments, passages 2 and 3 are formed from a common circular/cylindrical hole separated by partition wall 4.

Referring to FIG. 9, the left end of both air-fuel mixture passage 3 and air intake passage 2 are connected to an air cleaner on the upstream side. The right end of both air-fuel mixture passage 3 and the air intake passage 2 are connected to an air intake passage and a scavenge air passage via an engine side insulator on the downstream side (not illustrated in drawings).

In some embodiments, throttle valve 900 is disposed in a bottomed, cylindrical throttle valve hole 5 formed perpendicular to carburetor main body 1. Throttle valve 900 is configured to be rotated by a rotation shaft provided on an axis and to move in the axial direction along with this rotation. In some embodiments, throttle valve 900 is configured to move in the axial direction of the rotation shaft while it is rotating by the rotation shaft (not shown).

Figure 10:
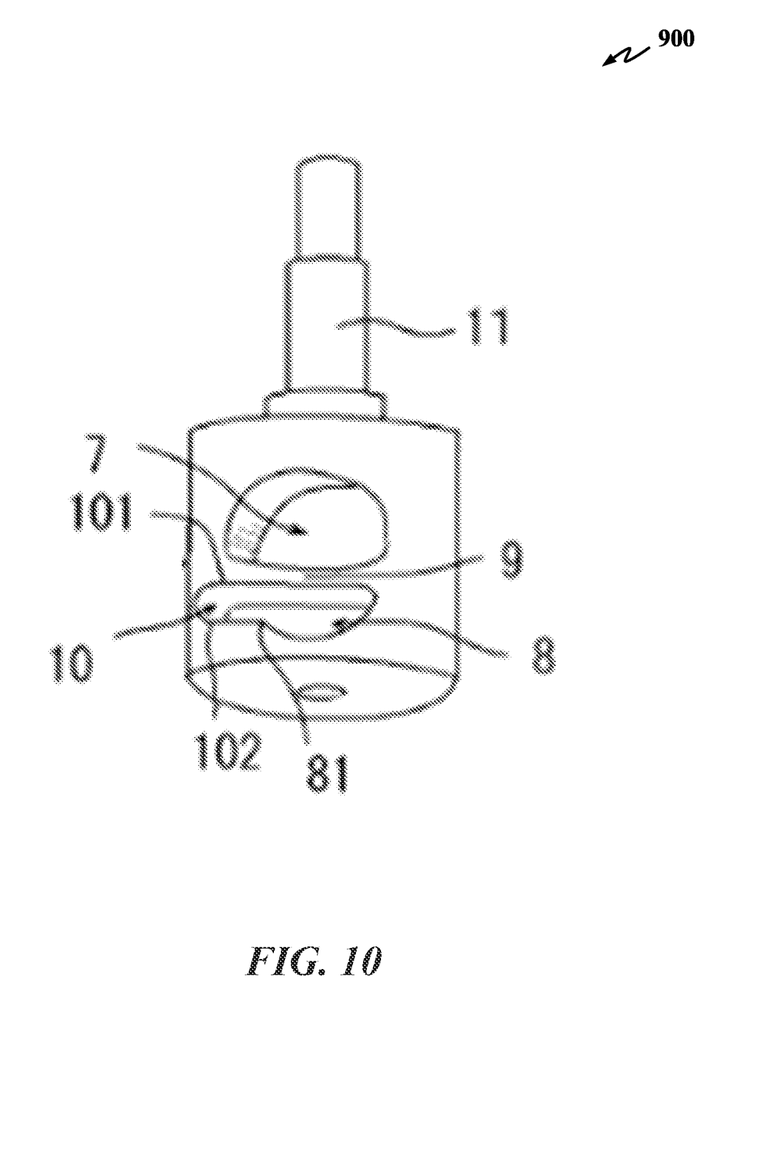
FIG. 10 is a perspective diagram of a throttle valve in accordance with some embodiments of the present disclosure.

FIG. 10 illustrates throttle valve 900 in accordance with some embodiments of the present disclosure. Throttle valve 900 can be a single cylinder having substantially the same diameter as the throttle valve hole 5 illustrated in FIGS. 8 and 9. In some embodiments, air supply side valve hole 7 and a fuel supply side valve hole 8 are formed in the throttle valve 900 penetrating across the radial direction of throttle valve 900. The air supply side valve hole 7 can have an upper semicircular cross-sectional shape.

Fuel supply side valve hole 8 can also have a lower semicircular cross-sectional shape. A partition wall 9 is disposed between air supply side valve hole 7 and fuel supply side valve hole 8. In some embodiments, holes 7, 8 can be formed from a common cylindrical/circular hole that is mutually separated.

Air supply side valve hole 7 is configured to supply air to air intake passage 2 to control the flow ratio of scavenging air. Fuel supply side valve hole 8 is configured to supply a fuel-air mixture to air-fuel mixture passage 3 to control engine output. In some embodiments, air intake passage 2, air-fuel mixture passage 3, air supply side valve hole 7, and the fuel supply side valve hole 8 can have substantially the same cross-sectional shape. Additionally, both passages 2 and 3 can be formed from one common cylindrical hole such that they mutually coincide through partition walls 4 and 9.

Groove pocket 10 can be formed on the fuel supply side valve hole 8 of throttle valve 900. Groove pocket 10 can be formed on the opening edge of fuel supply side valve hole 8. The opening edge can be on the upstream end of the throttle valve 900, which is on the accelerating rotation direction side.

When throttle valve 900 is idle, air-fuel mixture passage 3 is opened while air intake passage 2 is closed due to throttle valve 900 being first and due to the partial overlap of groove pocket 10 and the air-fuel mixture passage 3. In other words, because groove pocket 10 of fuel supply side valve hole 8 is fluidically communicated first, all air and fuel are supplied to the engine side via the groove pocket 10. Additionally, fuel emulsion supplied to the engine can become relatively high speed, groove pocket 10 can bring about the action and effect of improving engine speed reduction in idling and all positions changing.

In some embodiments, groove pocket 10 can have a tongue-shaped opening end with parallel opposing sides 101 and 102 separated by a gap therebetween. Side 102 can start at opening edge 81 on the upstream end of the accelerating rotation direction of fuel supply side valve hole 8.

Additionally, the opening on the downstream side of opening end 31 (see FIG. 9) on at least the throttle valve 900 side of the air-fuel mixture passage 3 is formed on a perpendicular side 32 (see FIG. 8) parallel to the axis of the throttle valve 900. The opening on the downstream side of opening end 31 has a prescribed length and shape such that the extent of the opening (e.g., total surface area exposed) is constant from the initial configuration and after the adjustment of the throttle valve 900. In other words, the total surface area of opening 10 remains constant during any adjustment of throttle valve 900.

In this manner, when throttle valve 900 rotates horizontally to the idle operation position, the groove pocket 10 first overlaps with the air-fuel mixture passage 3, which cause fuel supply side valve hole 8 and air-fuel mixture passage 3 to fluidically communicate. Additionally, fuel supply side valve hole 8 is opened before the air supply side valve hole 7.

Throttle valve 900 rotates horizontally around a rotation shaft 11 due to the rotation of a throttle lever 13 attached to the terminal of the rotation shaft 11 protruding from a throttle valve cover 12. Throttle lever 13 and throttle valve 900 rotate horizontally while gradually being lifted by, for example, a cam mechanism provided between the carburetor main body 1 and throttle lever 13. To the extent of the openings of the air supply side valve hole 7, the fuel supply side valve hole 8, air intake passage 2, and air-fuel mixture passage 3 formed on the carburetor main body 1 are changed, a prescribed amount of fuel is released from a metering chamber 19. Metering chamber 19 is isolated from an air chamber 18, which is open to the atmosphere from a vent hole, by a metering diaphragm 17 and positioned on the bottom surface of the side opposite the throttle valve cover 12.

Needle 15 can be attached to the rotation shaft 11. Needle 15 can protrude and extend from inside fuel supply side valve hole 8 across air supply side valve hole 7 from the upper portion. Fuel flows out from a main nozzle 20 provided in the fuel supply side valve hole 8 (detailed description thereof will be omitted).

Figure 11A:
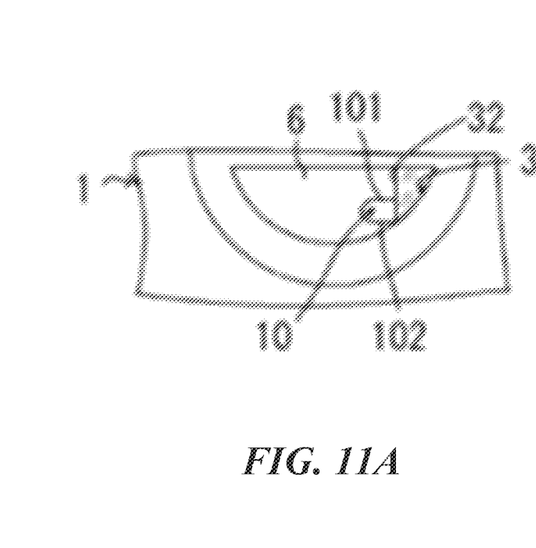
FIG. 11A illustrates a throttle valve in a state prior to adjustment of the fuel flow in accordance with some embodiments of the present disclosure.
Figure 11B:
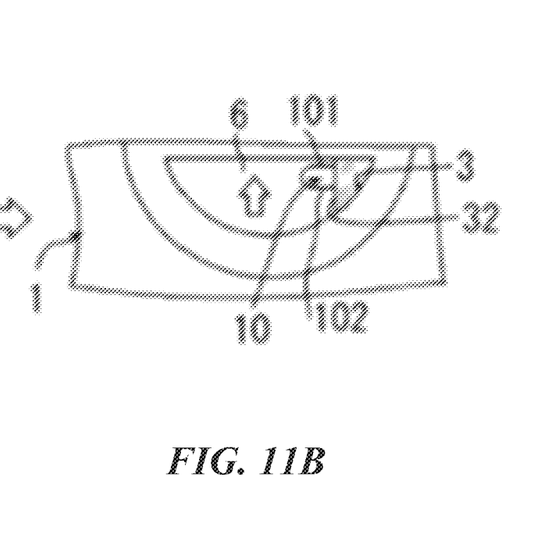
FIG. 11B illustrates the throttle valve shown in FIG. 11A in a state following adjustment of the fuel flow in accordance with some embodiments of the present disclosure.

FIGS. 11A and 11B illustrate rotary type carburetor 800 for a stratified scavenging engine in accordance with some embodiments of the present disclosure. In an idle position, groove pocket 10 portion (of the fuel supply side valve hole 8 in the throttle valve 900) overlaps the opening on the downstream side of the air-fuel mixture passage 3 formed on carburetor main body 1. In the bench test, throttle valve 900 is moved in the axial direction using an adjusting screw (not illustrated in the drawings), and the air flow and the fuel flow are adjusted to a predetermined target specification by adjusting the insertion depth into the fuel nozzle. The insertion depth can be adjusted by moving the metering pin in the axial direction using a fuel adjusting screw (not illustrated in the drawings), which can be integrated into the engine. However, because the opening on the downstream side of the opening end 31 is formed on the perpendicular side 32 parallel to the axis of the throttle valve 900 and with a prescribed length, and even if the fuel flow is increased by adjusting the throttle valve 900 to move, for example, in the direction of the arrow as illustrated in FIG. 11B, the extent of the opening from the groove pocket 10 of the fuel supply side valve hole 8 on the throttle valve 900 does not change as it does in the conventional example illustrated in FIG. 5. Therefore, the fuel flow can be adjusted without affecting the air flow in the throttle valve 900, these can be easily adjusted to a predetermined target specification. In this manner, productivity is improved.

In some embodiments, because groove pocket 10 portion of the fuel supply side valve hole 8 in throttle valve 900 has a tongue-shaped opening end (with parallel opposing sides 101 and 102 disposed having a prescribed gap therebetween), the amount of the opening from the groove pocket 10 does not change even if the fuel flow is increased by adjusting the throttle valve 900. Stated differently, opening does not extend further into air-fuel mixing chamber 3 when throttle valve 900 is adjusted. In this way, adjustment can be made on rotary type carburetor 800 simpler and more efficient. Additionally, in the above manner, carburetor 800 can be made more efficient when using a groove pocket having different shape such as the tongue shape illustrated in FIG. 10. In some embodiments, the size of the opening of groove pocket 10 is reduced starting from edge 81 of valve hole 8. In other words, valve hole 8 can have two portions, a larger portion and a smaller portion. Groove pocket 10 is the smaller portion and can be disposed on the downstream side. When the fuel flow is increased by adjusting the throttle valve 900 due, the opening (i.e., groove pocket 10) on the downstream side of the opening end 31 is formed on the perpendicular side 32 parallel to the axis of the throttle valve 900 having a prescribed length.

Figure 12:
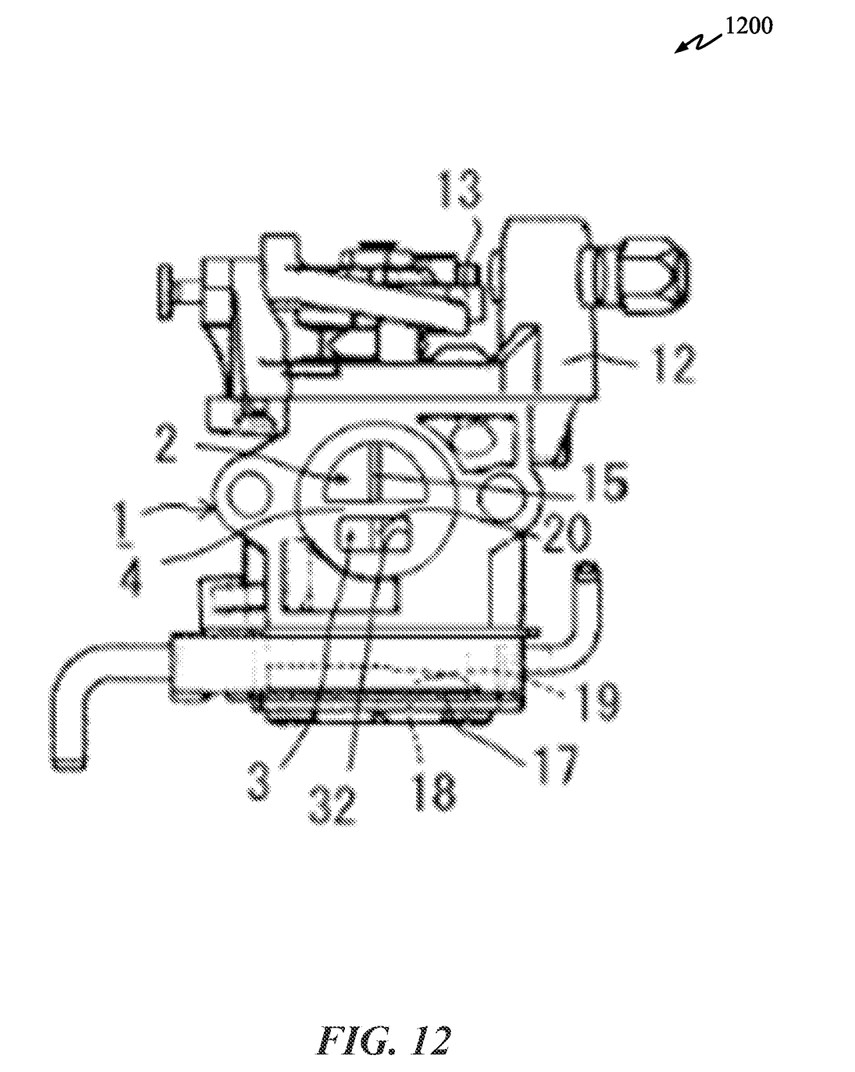
FIG. 12 is a front view of a carburetor main body in accordance with some embodiments of the present disclosure.
Figure 13A:
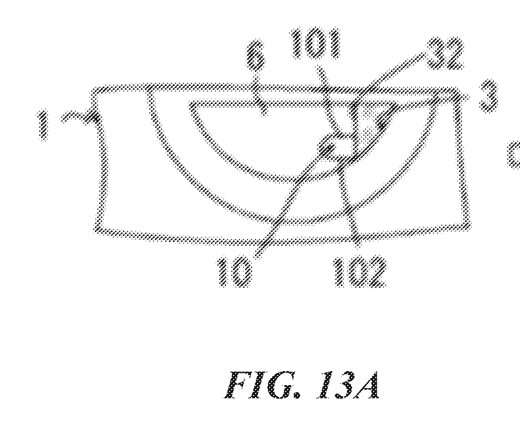
FIG. 13A illustrates a throttle valve in a state prior to adjustment of the fuel flow in accordance with some embodiments of the present disclosure.
Figure 13B:
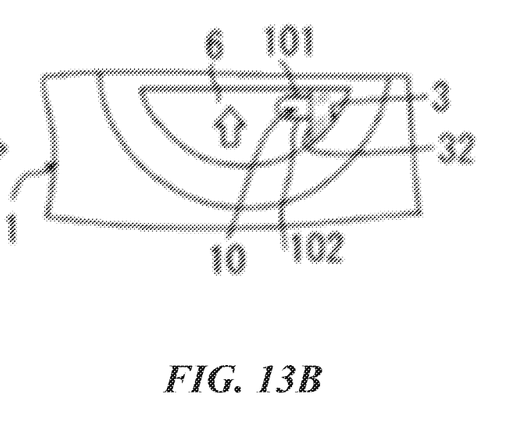
FIG. 13B illustrates the throttle valve shown in FIG. 13A in a state following adjustment of the fuel flow in accordance with some embodiments of the present disclosure.

FIGS. 12 and 13 illustrate a carburetor 1200 in accordance with some embodiments of the present disclosure. Carburetor 1200 can have one or more of the features of carburetor 800 as described in FIGS. 8-11. While the opening on the downstream side of the opening end 31 on the throttle valve 900 side forms a perpendicular side 32 parallel to the axis of the throttle valve 900 having a prescribed length on the downwardly oriented semicircular air-fuel mixture passage 3 formed on the carburetor main body 1 in the embodiments illustrated in FIG. 1 to FIG. 4, these differ in that the shape of the air-fuel mixture passage 3 is formed in a rectangular shape including the perpendicular side 32.

The action and effect of carburetor 1200 are the same as the embodiments illustrated in FIGS. 8 to 11. However, while the opening on the downstream side of the opening end 31 (see FIG. 2) on the throttle valve 900 side is formed on a perpendicular side 32 parallel to the axis of the throttle valve 900 having a prescribed length, wherein the air-fuel mixture passage 3 in the embodiments illustrated in FIG. 1 to FIG. 4 is basically in a downwardly oriented semicircular shape, the processing of the air-fuel mixture passage 3 is simplified.

Although certain features from a conventional carburetor (FIG. 1) and features from the improved carburetor (FIG. 8) of the present disclosure may have the same reference numbers, those features with the same reference number may not be the same. Where the reference numbers are the same in both the conventional carburetor and the new & improved carburetor, they are for reciting the name of the components. For example, passage 7 of throttle valve 900 can be completely different from passage 7 of throttle valve 6. In another example, groove pocket 10 of throttle valve 900 (FIG. 10) can be different from groove pocket 10 throttle valve 6 of FIG. 3. Additionally, items in FIGS. 8 through 13B with the same reference numbers as items in FIGS. 1-5 can have one or more of the same features and functionalities as described in FIGS. 1 through 5. For example, passage 7 of throttle valve 900 (FIG. 9) can have one or more of the same features/functions of passage 7 of throttle valve 6 in FIG. 1.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A rotary type carburetor for a stratified scavenging engine comprising:
   an air intake passage and an air-fuel mixture passage formed in a horizontal direction on a carburetor main body, wherein the opening shape of the opening end of at least the throttle valve side of the air-fuel mixture passage is rectangular; and
   a throttle valve fitted into a bottomed cylindrical throttle valve hole formed orthogonal and perpendicular to a passage of the carburetor main body, wherein the throttle valve has an air supply side valve hole formed on the air intake passage side, a fuel supply side valve hole formed on the air-fuel mixture passage side, a groove pocket formed on an opening edge on an upstream end that is on a side of an accelerating rotation direction of the fuel supply side valve hole, and an opening shape on a downstream side of an opening end on at least the throttle valve side of the air-fuel mixture passage is formed perpendicular to a side parallel to an axis of the throttle valve.

2. A rotary type carburetor comprising:
a cylindrical throttle valve hole formed orthogonal and perpendicular to a passage of the carburetor main body;
a throttle valve rotationally fitted into the cylindrical throttle valve hole, the throttle valve comprises:
   an air supply side valve hole formed on the air intake passage side,
   a fuel supply side valve hole formed on the air-fuel mixture passage side,
   a groove pocket formed on an opening edge on an upstream end of the fuel supply side valve hole, wherein the upstream end comprises a side toward a direction of accelerating rotation; and
   an opening shape on a downstream side disposed on a perpendicular side parallel to an axis of the throttle valve,
wherein the opening shape of the opening end of at least the throttle valve side of the air-fuel mixture passage comprises a rectangular shape.

* * * * *